(12) United States Patent
Maziers et al.

(10) Patent No.: US 7,514,032 B2
(45) Date of Patent: Apr. 7, 2009

(54) POLYMER PROCESSABILITY EVALUATION THROUGH ON-LINE IMAGE PROCESSING

(75) Inventors: Eric Maziers, Seneffe (BE); Pierre Pestiaux, Seneville sur Fécamp (FR)

(73) Assignee: Fina Technology, Inc., Houston, TX (US)

( * ) Notice: Subject to any disclaimer, the term of this patent is extended or adjusted under 35 U.S.C. 154(b) by 575 days.

(21) Appl. No.: 10/520,043

(22) PCT Filed: Jul. 1, 2003

(86) PCT No.: PCT/EP03/07063

§ 371 (c)(1),
(2), (4) Date: Sep. 2, 2005

(87) PCT Pub. No.: WO2004/005008

PCT Pub. Date: Jan. 15, 2004

(65) Prior Publication Data

US 2006/0163778 A1 Jul. 27, 2006

(30) Foreign Application Priority Data

Jul. 2, 2002 (EP) .................................. 02077735

(51) Int. Cl.
B29C 47/92 (2006.01)
(52) U.S. Cl. .................... 264/409; 264/412; 264/40.1; 264/40.7

(58) Field of Classification Search ................ 264/40.1, 264/40.3, 40.4, 40.5, 40.6, 40.7, 406, 408, 264/409, 412; 356/28
See application file for complete search history.

(56) References Cited

U.S. PATENT DOCUMENTS

| 3,826,926 | A | * | 7/1974 | White et al. ................... 377/57 |
| 4,341,827 | A | * | 7/1982 | Austen et al. ............. 428/36.91 |
| 4,382,761 | A | | 5/1983 | Daubenbuchel et al. |
| 4,755,127 | A | | 7/1988 | Becker |
| 5,325,178 | A | * | 6/1994 | Louis et al. .................. 356/630 |
| 5,399,302 | A | | 3/1995 | Noguchi et al. |
| 5,840,223 | A | | 11/1998 | Feuerherm et al. |
| 6,258,301 | B1 | * | 7/2001 | Feuerherm et al. ......... 264/40.1 |

FOREIGN PATENT DOCUMENTS

| JP | 59100670 | A | * | 6/1984 |
| JP | 10300680 | A | * | 11/1998 |
| JP | 2001124516 | A | * | 5/2001 |

* cited by examiner

Primary Examiner—Mathieu D. Vargot
(74) Attorney, Agent, or Firm—Tenlev R. Krueger

(57) ABSTRACT

This invention discloses the use of one or three cameras equipped with a charge coupled device (CCD) sensor and of laser detectors for characterizing respectively in two or three dimensions, the behavior of an extrudate at the exit of a die, said CCD camera(s) being synchronized with a flash by the laser detectors.

16 Claims, 6 Drawing Sheets

D = Scrap measure , D*2 = Parison circumference at this position .

Spatial resolution = 150 μ.
Processing sequence : Equalization & edge detection (Kirsh)

POLYMER PROCESSABILITY EVALUATION THROUGH ON-LINE IMAGE PROCESSING

This invention relates to the use of charge-coupled device (CCD) cameras to characterise the behaviour of a molten polymer-as it exits a die.

The degree to which a resin swells or recovers when exiting the extrusion dies is an extremely important resin characteristic in most processing applications. In blow moulding, die swell is critical due to the relationship between moulds and down-stream equipment and because of the relative swell exhibited by the resin during processing. Each application requires a preferred amount of swelling: too little swelling may result in lack of strength or lack of toughness, whereas too much swelling may result in waste of material or in curtaining. It is therefore highly desirable to be able to correlate swell behaviour with resin formulation, operating conditions and die design.

In the blow moulding process, a strand of hot polymer is trapped within a mould and blown into the configuration of the mould. The shape of the parison as the mould closes determines the physical characteristics of the finished product. The design of the extrusion die influences the amount of polymer exiting the die and is thus a very important parameter. In addition, as the polymer extruding from the die is a viscoelastic material, it undergoes the effects of orientation acquired during extrusion through the die as well as the effect of gravity. The swell and drawdown occurring after the polymer has emerged from the die determine the distribution of polymer in the parison and therefore the final characteristics of the product and the cycle time. The swell and drawdown have thus been studied extensively. For example Beynon and Glyde (Beynon, D. L. T. and Glyde, B. S., "The swelling and fracture of polyethylene melts." In British Plastics, 414, September 1960.) have studied the swell has a function of shear rate, temperature and flow rate. Wechsler and Baylis (Wechsler, R. L., and Baylis, T. H., "Blow molding polyethylene", Part I, in Modem Plastics, 107, 218, May 1959 and Part II in 115, 127, June 1959) have studied the swell as a function of melt temperature and extrusion rate.

Several experimental techniques have been developed to study swell and sag. As swell is a manifestation of the melt viscoelasticity, it is a time-dependent quantity. Furthermore, at the same time that it is swelling, the parison is also sagging under the influence of gravity, and its observed dimensions reflect the combined phenomena. It is thus desirable to be able to measure swell independently of sag. Methods for measuring swell include the pinch-off mold as described in Sheptak and Beyer (Sheptak, N. and Beyer, C. E., "Know your parison." In SPE Journal, 190, February 1965). Other techniques are off-line methods and include a photographic method yielding parison diameter swell and drawdow, a photographic technique yielding relaxation data, a multiple pinch-off device yielding material distribution and thickness. The photographs were then analysed and the parison had to be reconstructed from the photographs; this exercise proved to be difficult and not without errors.

Optical methods using either beam deflection or spectral attenuation are described in Cielo et al. (Cielo, P., Lamontagne, M. and Vaudreuil, G., in ISA Trans., 27, 1, 1988). They are accurate to measure the thickness of plastic sheets but do not take into account the parison geometry.

The most precise method consists of extruding the parison into an oil bath having the same temperature and density as the melt and to take photographs at several intervals or to monitor the process using a photodiode array (Garcia-Rejon, A., and Dealy, J. M., in Polym. Eng. Sci., 22, 158, 1988 or Kamal, M., R., Samara, M., in Adv. Polym. Technol., 8, 367, 1988). These methods are difficult to use in commercial applications and the influence of oil on swell is not well understood.

The effect on the swell of the resin's molecular weight distribution, of the die configuration, of the temperature and of the flow rate have been studied and discussed by Swan et al. (Swan, P. L., Dealy, J. M., Garcia-rejon, A., and Derdourt, A., in Polym. Eng. and Sci, 31, 705, 1991).

In a recent artist by Jivraj et al.(Jivraj, N., Sehanobish, K., Ramanathan, R., Garcia-Rejon, A;, and Carmel, M., in The 2001 Conference of the PPS held in Montreal), the relationship between the resin's basic rheological properties and the parison behaviour have been studied.

The sag has been studied by the same pinch-off mould and photographic methods as described for the swell.

In addition, the swell and sag have been studied for several die designs by the capillary rheology approach. It has been found that for comparable shear rate at the die exit the flow kinematics of the material exiting the different dies are not comparable. Changing the length (L) over diameter (D) ratio L/D of the dies did not bring a better agreement between the divergent observations.

The swell has also been studied by the "scrap" method, whereby the scrap is not detached from the parison as seen in FIG. 1. The diameter of the parison and thus the swell is approximately twice the width of the scrap.

Another important parameter is the melt fracture that influences the texture of the finished product. Melt fracture is a loosely defined term that has been applied to the various forms of extrudate roughness or distortion that are encountered at high extrusion rates for all polymer melts. It is used to describe small-scale roughness, or rippling, or sharkskin, or a very regular helical screw-thread extrudate, or any type of irregular extrudate. Generally, these defects and irregularities are inspected by human eye resulting in imprecise evaluation and in long delays between the detection of the imperfection and the machine shut down.

Die deposit or die built-up consists of small drops of low molecular weight polymer ejected from the parison just after exiting the die. It is also evaluated visually and therefore with the same bias and drawbacks as the melt fracture estimates.

There is thus a need to characterise quickly and rigorously the molten polymer behaviour at the exit of a die.

The present invention provides a method for obtaining instantaneous information in two or three dimensions on the die combined swell and sag of the extrudate as a function of the extrusion conditions such as for example the shear rate, the temperature or the die design and as a function of the polymer structure or type.

The method further provides instantaneous information on the "only swell" and "only sag" components of the extrudate.

The method also provides on-line information on the surface texture of the polymer.

In addition the method allows instantaneous detection of die built up.

The method yet provides information on the rheological properties of the resin.

Accordingly, the present invention discloses the use of one or three charge-coupled device (CCD) camera(s) and laser detectors for characterising instantaneously, respectively in two or three dimensions, the behaviour of a molten polymer at the exit of a die, said CCD camera(s) being synchronised with a flash by the laser detectors.

A charge-coupled device is a light sensitive integrated circuit that stores and displays the data for an image in such a way that each picture element (pixel) in the image is converted into an electrical charge, the intensity of which is related to the intensity of light striking it. CCDs can be included in both still and video cameras. In the present invention still cameras are used for optical character recognition. The captors presently used are 16-bit CCD sensors working in black and white: they provide $2^{16}$ shades of grey.

In the high performance two-phase charge-coupled sensors of the present invention a transparent electrodes replaces one of the polysilicon gates. The transparent gate is less absorptive then polysilicon and its index of refraction provides a better match between the overlying oxide and the silicon substrate than that of the polysilicon, resulting in less reflective loss. The sensors are built with a true two-phase buried channel CCD process that is optimised for operations in multi-pinned phase (MPP) mode for low dark current. The low dark current produces the best signal-to-noise ratio when sensors are operated at low signal levels. The true two-phase architecture provides many advantages such as progressive scan, square pixels, high charge capacity and simplified drive requirements. The photon-to-electron conversion ratios of most CCDs are similar, but the size of the photosensitive area makes their performance unequal. Responsivity is a measure of the signal that each pixel can produce and is directly proportional to the pixel area. As the responsivity of the pixel increases, the same amount of signal can be collected in a shorter time or conversely, more signal can be collected during a fixed exposure time. In addition, with low-level illumination, the image has a higher signal-to-noise ratio and appears less grainy. Larger pixel areas also help improve the dynamic range because they hold more charge and are thus not saturated quickly with bright objects.

The method of the present invention is used in the process itself and can be used for characterising molten polymers. The extrusion parameters and the properties of all thermoplastic resins such as for example polyethylene (PE), polypropylene (PP), polystyrene (PS) polyvinyl chloride (PVC), polyamide (PA), polymethyl methacrylate (PMMA), polyoxymethylene (POM), acrylonitrile-butadiene-styrene (ABS), polycarbonate (PC), polyacrylonitrile (PAN), styrene-acrylonitrile (SAN), ethylene vinyl acetate (EVA) can be characterised with the present CCD camera system. Preferably, PE and PP have been used and more preferably PE.

The method can be used in the process control system of blow-moulding machines or for pipe or profile applications. It can also be used for characterising the resin by the extruder rheology method.

The shear rates that can be evaluated with this method range from near zero up to 30,000 s-1.

All die types such as for example annular die or flat die can be evaluated.

The present invention also discloses a method for characterising an extrudate flowing under the die tooling that comprises the steps of:

providing one vertically moving laser or several vertically aligned lasers that detect the lower edge of the extrudate exiting the die and that emit successive digital signals upon detection of said lower edge;

providing a micro controller that receives the successive digital signals from the vertically moving laser or from the several vertically aligned lasers;

providing a flash that is activated by the micro controller;

providing a CCD camera that is activated by the micro controller and that is synchronised with the flash;

recording the time at each step;

recording the digital information at each step;

providing a software that calculates instantaneously the equation for the swell in diameter and in weight and the sag of the extrudate.

The time can be recorded with an accuracy of $1/1,000$ sec.

The flash duration determines the speed at which the picture remains clear and is thus a key factor of the system. It is preferred to work between $1/16$ and $1/64$ of the flash power. The flash duration is thus preferably within the range of $1/9$, 100 to $1/28,000$ sec. It is thus possible to obtain up to 20 images/s and therefore to work with a linear speed of the parison or melt strand of up to 2 m/s.

The dynamic level of the camera and laser are also important parameters. The laser can be displaced at a speed of up to 2 m/s and it can be adjusted with an accuracy of the order of the mm.

The method according to the present invention may also comprise the additional step of providing a feedback software, capable of adjusting the parameters of die, temperature and the shear rate in order to instantaneously optimise the extrudate's properties.

LIST OF FIGURES

The upper curve yH is represented by the third order equation $$yH=299.045+0.236x-7.28.10^{-4}x^2+5.079.10^{-7}x^3$$

The lower curve yL is represented by the third order equation $$yL=225.176-0.106x-2.17.10^{-4}x^2+5.24.10^{-7}x^3$$

Figure 4:
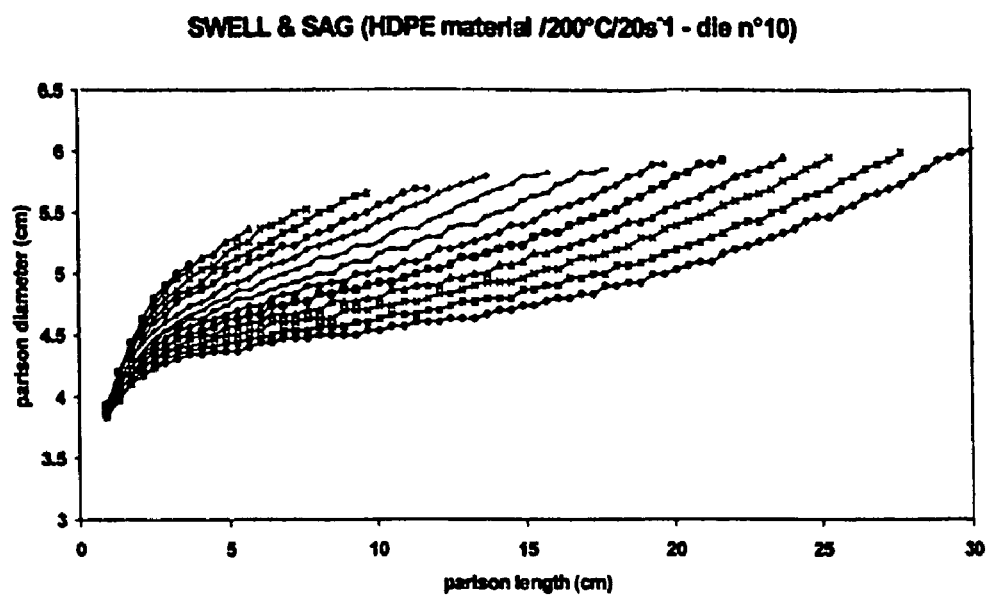

FIG. 4 represents the combined swell and sag curves obtained by polynomial fit of the parison diameter as a function parison length at several times after exiting the die. The parison diameter and length are expressed in cm. The measurements were carried out at a temperature of 200° C. and with the die n° 10.

Figure 3:
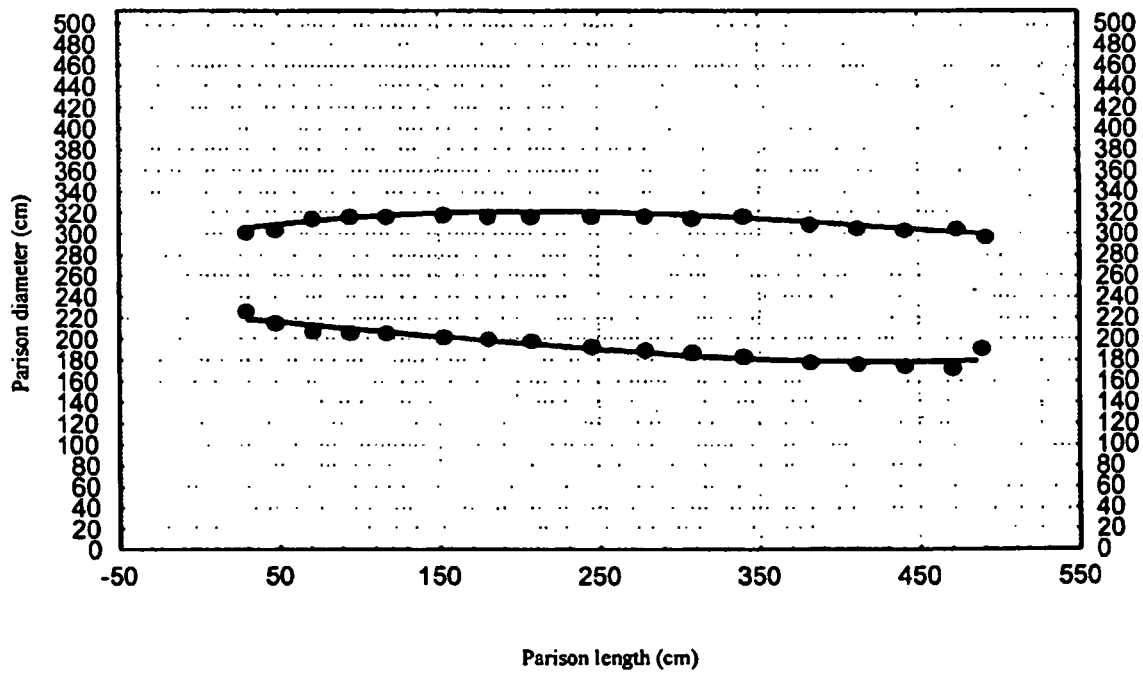
FIG. 3 represents the result of a global fitting in x and y for the diameter swell wherein x represents the vertical distance from the die exit and is expressed in cm and y represents the lateral distance from the vertical axis and is also expressed in cm. The equation for y as a function of x is calculated instantaneously by a polynomial fit of degree 3.
Figure 5:
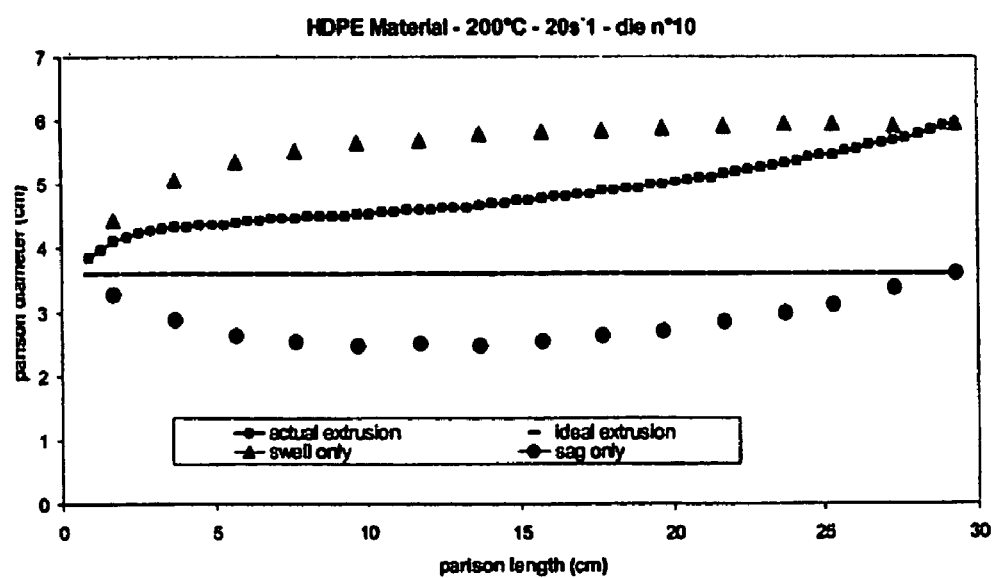

FIG. 5 represents respectively the "only swell" and "only sag" curves as derived from the combined swell and sag curves of FIG. 3. The parison diameter expressed in cm is plotted as a function of parison length also expressed in cm respectively for the combined sag and swell, for the ideal extrusion (a tube having the die diameter), for the "only swell" and for the "only sag".

Figure 6:
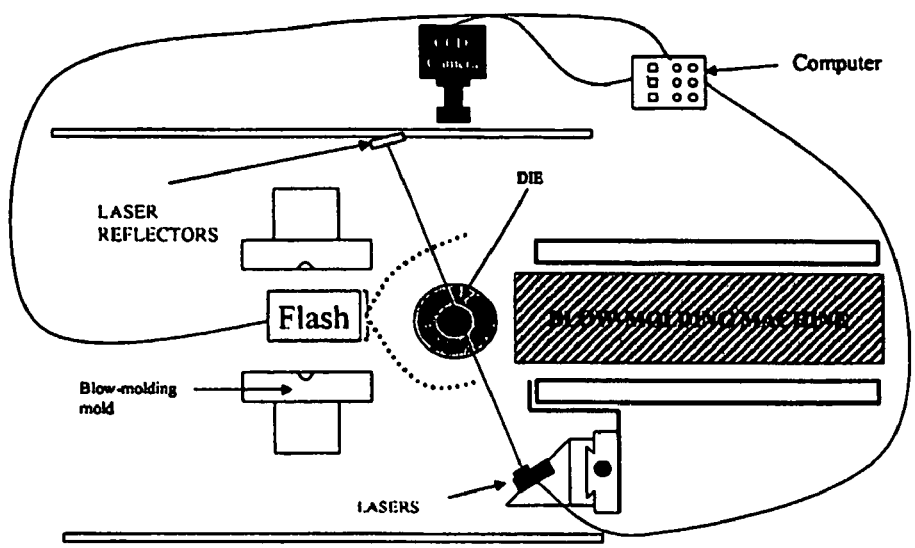

FIG. 6 represents the one-camera set up for the two-dimension polymer characterisation wherein the laser activates a signal when the lower end of the extrudate exiting the die interrupts the laser beam crossing between said laser and a laser reflector and said signal is transmitted via a computer synchronously to the CCD camera and to the flash.

Figure 7:
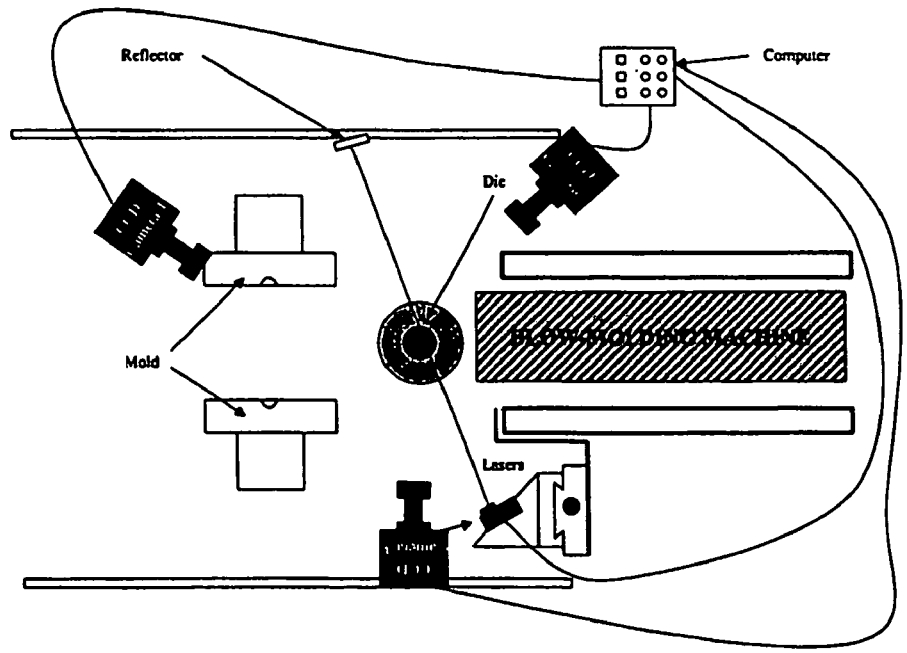

FIG. 7 represents the three-camera set up for the three-dimension polymer characterisation. It operates exactly like the two-dimension set up.

Figure 8:
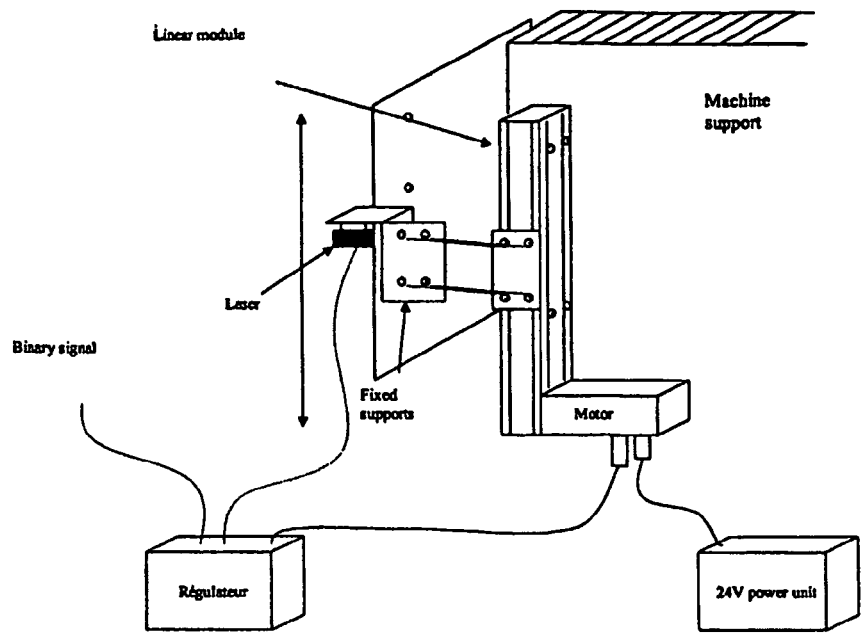

FIG. 8 represents the vertically moving laser system.

Figure 9:
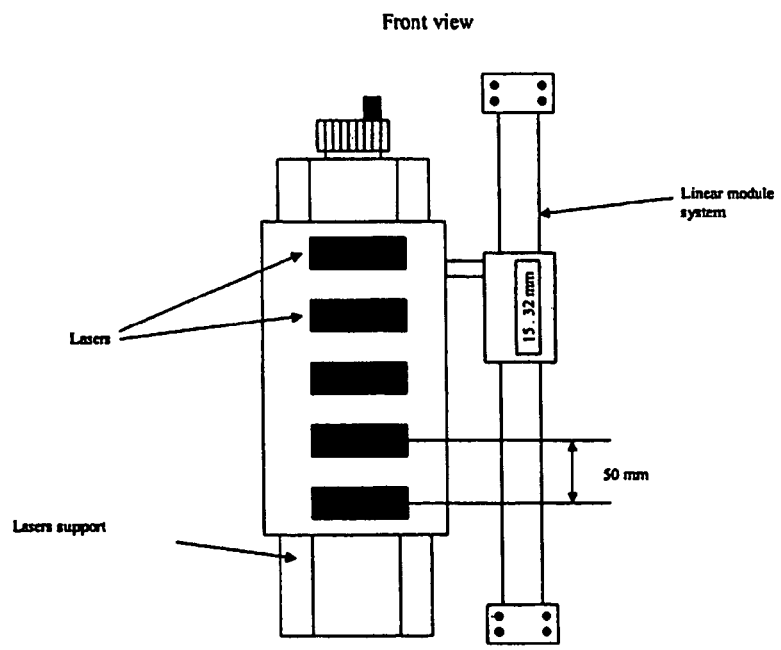

FIG. 9 represents the system of several fixed vertically aligned lasers.

Figure 10:
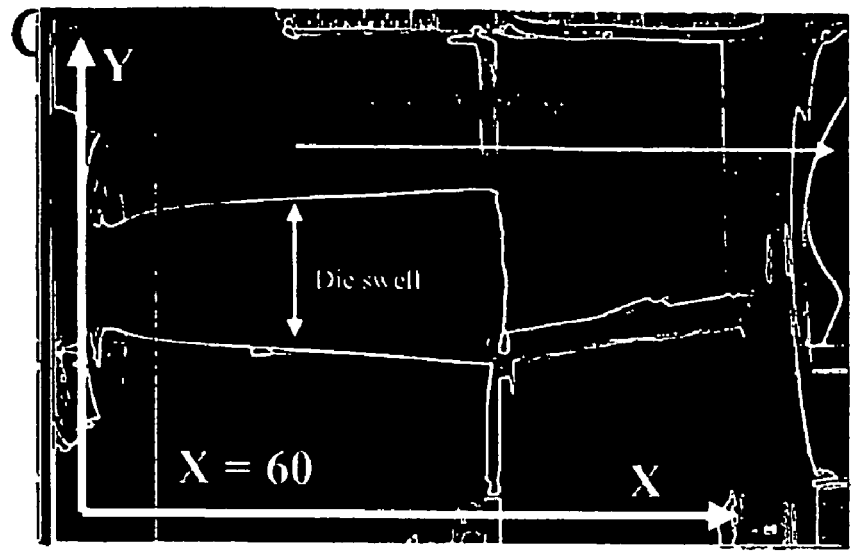

FIG. 10 represents a photograph of the extrudate's diameter swell at a distance x=60 pixels from the die exit.

Figure 11:
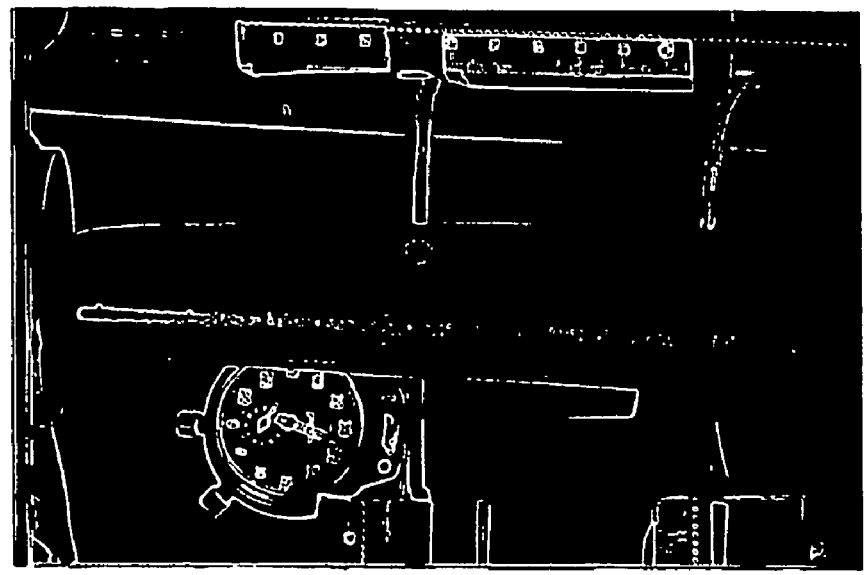

FIG. 11 represents a photograph showing incipient melt fractures on the extrudate.

The data retrieved are the die swell both in diameter and in weight, the sag, the concentration and type of melt fracture and the concentration of die built up: they are all recorded as a function of shear rate and temperature for a defined die design. The shear rate can be modified either by changing the die gap for a fixed output or by changing the output without changing the die gap.

It is also possible to derive information on the characteristics of the resin such as for example the relaxation time defined as the time necessary to suppress the effect of orientation acquired by the molten material during its passage through the die.

The swell in diameter is defined as the ratio of the parison diameter to the die diameter.

Figure 1:
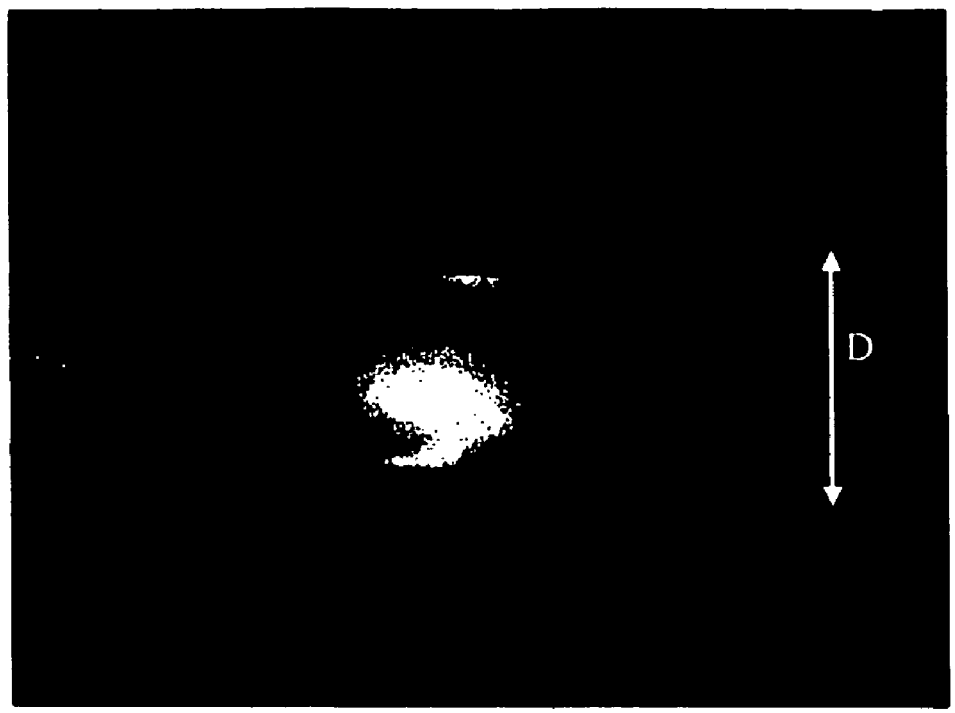
FIG. 1 is a photograph of the parison with the "scrap" still appended thereto. It is used for determining the diameter swell, defined as twice the width of the scrap.
Figure 2:
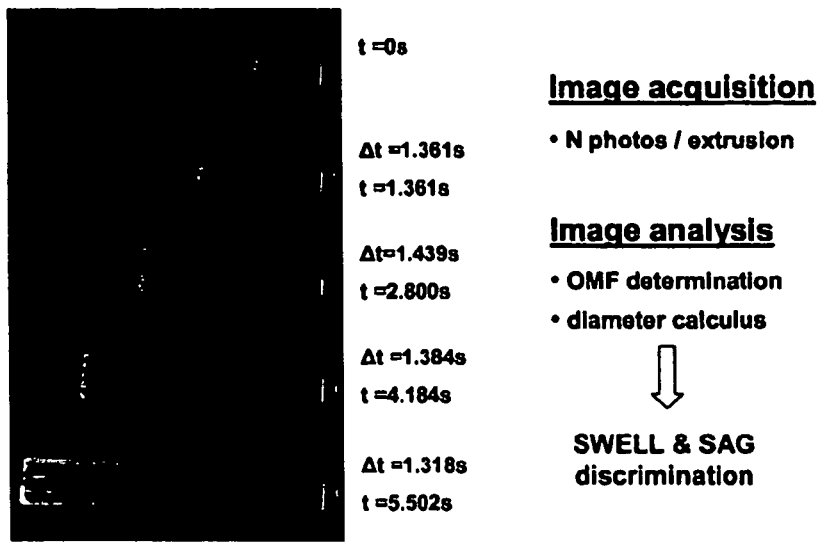
FIG. 2 represents a sequence of photographs of the parison at several times after exiting the die. This sequence of photographs enables the subsequent determination of the sag and swell and the determination of the onset of melt fracture (OMF).

The swell in diameter at time t is evaluated through image processing. The software calculates instantaneously the combined swell and sag curve by fitting the observed parison wall, at time t after exiting the die, with a polynomial of the general formula:

$$y = ax^n + bx^{n-1} + cx^{n-2} + \ldots + z$$

wherein x is the distance from the die exit, y is the parison diameter and n is an integer of from 3 to 11, depending upon the accuracy required. FIG. 2 represents photographs of the parison at several times after exiting the die and FIG. 3 represents a polynomial fit of degree 3 for one of these photographs.

The swell and sag are additive phenomena leading to the final parison diameter the swell increases the parison diameter whereas the sag tends to decrease it. FIG. 4 represents the combined swell and sag expressed by a polynomial fit of the walls of the parison at several times after exiting the die.

The lower end of the parison is not affected by sagging as there is no material attached below and therefore no stretching caused by gravity pull. The diameter evolution of the lower end of the parison gives thus the true swelling factor and it leads to an extrapolated "only swell curve". A tube having the die dimension represents the "ideal" extrusion curve. The "only sag curve" is calculated as $$Sag = observed + ideal - swell$$

as represented on FIG. 5.

The evolution of the swell phenomenon can be fitted by the exponential equation $$D = Do + (D\infty - Do) \cdot (1 - \exp(-t/\lambda))$$

wherein D is the parison diameter at time t, Do is the external die diameter, $D\infty$ is the final parison diameter and $\lambda$ is the characteristic relaxation time related to the swelling phenomenon.

The swell in weight is defined as the weight of a parison of predetermined length as a function of shear rate. The swell in weight Sw is the product of the swell in diameter Sd and the swell in thickness St $$Sw = Sd \times St$$

The parison weight or swell in weight decreases with increasing shear rate as the die gap is progressively closed in order to increase the shear rate. The swell in thickness is given by the formula $$St = m/(\pi p L h (Do - h)) \cdot Do/D$$

wherein p is the resin's density, h is the die gap, Do is the external die diameter, D is the final parison diameter, L is the parison length and m is the parison weight. It increases with increasing shear rate.

The melt fracture and die built up are determined by image processing. The sensors used in the present invention provide over 30,000 shades of grey allowing instantaneous detection of irregularities in the extrudate.

The present invention thus provides a novel system capable of providing in two or three dimensions instantaneous and simultaneous information on the parameters characterising the behaviour of extrudates at the exit of a die. The information is directly related to the process and is based on shear rate. It can also provide information on the resin itself.

The same camera installation can also be used to study the deformation of a pinched paraison subjected to internal pressure or of a preform in injection stretch blow moulding.

EXAMPLE

The CCD sensor used in the present application is a megapixel progressive scan interline CCD with on-chip circuits commercialised by Kodak.

It has the following parameters:
architecture: interline CCD, progressive scan, non-interlaced
pixel count: 1000(H)×1000(V)
pixel size: 7.4 microns(H)×7.4 microns(V)
photosensitive area: 7.4 mm(H)×7.4 mm(V)
output sensitivity: 12 microvolt/electron
saturation signal: 40,000 electrons
dark noise: 40 electrons rms
dark current (typical): <0.5 nA/cm$^2$
dynamic range: 60 dB
quantum efficiency at 500, 540, 600 nm: 36%, 33%, 26%
blooming suspension: 100×
image lag: <10 electrons
smear: <0.03%
maximum data rate: 40 MHz/channel (2 channels)
integrated vertical clock drivers
integrated correlated double sampling (CDS)
integrated electronic shutter driver The high performance 15 bit CCD sensor with transparent gate electrode provides 32768 unsigned levels of grey, allows the acquisition of about 10,000 frames/s and covers a broad spectrum of from 400 to 1000 nm.

The installation is represented in FIG. 6 for a two-dimension acquisition working with a single camera system and in FIG. 7 for a three-dimension acquisition working with three cameras. The successive positions of the extrudate's lower end as a function of time can be determined either by a single laser moving along a vertical axis simultaneously with the extrudate as represented on FIG. 8 or by several vertically aligned fixed lasers as represented on FIG. 9.

The extruder was the blow moulding machine, Battenfeld VK1-4.

The die swell results are represented in FIGS. 2, 3 and 10.

FIG. 11 represents the melt-fracture onset. The very high sensitivity of the CCD sensors allows objective and early detection of all surface irregularities.

The present technology provides an outstanding gain in accuracy, completeness and rapidity.

The invention claimed is:

1. A method for characterizing an extrudate flowing under die tooling comprising:

(a) emitting a plurality of laser signals at a plurality of vertically displaced locations from a laser system responsive to detection of the lower edge of an extrudate exiting from a die to emit successive digital signals upon the detection of said lower edge;
(b) applying said digital signals successively from said laser system to a micro controller;
(c) activating a flash by said micro controller;
(d) providing at least one camera with a CCD sensor that is activated by the micro controller and synchronized with the flash;
(e) recording the times of said successive laser signals and digital signals; and
(f) providing a central processor that instantaneously calculates an equation For the combined swell and sag curve of the extrudate and generates separate sag and swell components corresponding to said curve.

2. The method of claim 1 wherein said plurality of laser signals are generated by a laser which is moved vertically as said signals are generated.

3. The method of claim 1 wherein said plurality of laser signals are generated by a plurality of vertically displaced lasers.

4. The method of claim 3 wherein said plurality of laser signals are sequentially generated by successively positioned vertically displaced lasers.

5. The method according to claim 1 wherein the CCD sensor is a two-phase charge-coupled sensor with a transparent electrode.

6. The method according to claim 2 wherein said laser is moved vertically at a speed of no more than 2 m/s.

7. The method according to claim 1 wherein the duration of said flash is within the range of $1/9,100$ to $1/28,000$ second.

8. The method according to claim 1 further comprising providing feedback software which functions to adjust production parameters of die design, temperature and shear rate.

9. The method according to claim 1 wherein said extrudate is a thermoplastic polymer.

10. The method according to claim 9 wherein the extrudate is selected from the group consisting of polyethylene, polypropylene, polystyrene, polyvinyl chloride, polyamide, polymethyl methacrylate, polyoxymethylene, acrylonitrile-butadiene-styrene, polycarbonate, polyacrylonitrile, styrene-acrylonitrile and ethylene vinyl acetate.

11. The method according to claim 1 wherein said extrudate is selected from the group consisting of polyethylene and polypropylene and mixtures thereof.

12. The method according to claim 1 wherein said extrudate comprises polyethylene.

13. The method according to claim 1 further comprising providing three of said cameras and characterizing the behavior of said extrudate exiting said die in three dimensions.

14. The method according to claim 1 wherein a single camera is employed to characterize the behavior of said extrudate exiting from said die in two dimensions.

15. The method according to claim 1 wherein the onset of melt fracture of said extrudate is detected.

16. The method according to claim 1 further comprising calculating the relaxation time of said extrudate.

* * * * *